US008527200B2

(12) United States Patent
Garrigan (10) Patent No.: US 8,527,200 B2
(45) Date of Patent: Sep. 3, 2013

(54) VISUAL AID FOR ASSISTING A USER IN INTERPRETING A DIGITAL MAP

(75) Inventor: Anthony T. Garrigan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/954,924

(22) Filed: Nov. 29, 2010

(65) Prior Publication Data

US 2012/0136568 A1 May 31, 2012

(51) Int. Cl.
*G01C 21/20* (2006.01)
(52) U.S. Cl.
USPC .......................................... 701/454; 701/532
(58) Field of Classification Search
None
See application file for complete search history.

(56) References Cited

U.S. PATENT DOCUMENTS

| | | | | |
|---|---|---|---|---|
| 7,548,814 | B2 * | 6/2009 | Pantalone et al. | 701/455 |
| 2004/0225436 | A1 * | 11/2004 | Yoshihashi | 701/208 |
| 2006/0069503 | A1 | 3/2006 | Suomela et al. | |
| 2009/0177385 | A1 | 7/2009 | Matas et al. | |
| 2009/0219209 | A1 | 9/2009 | Bush et al. | |
| 2009/0258660 | A1 | 10/2009 | Bush et al. | |

FOREIGN PATENT DOCUMENTS

| DE | 19817515 | * | 11/2000 |
|---|---|---|---|
| JP | 7-27844 | * | 1/1995 |

OTHER PUBLICATIONS

Morrison, et al., "My Location in your Palm," retrieved at <<http://googlemobile.blogspot.com/2008/06/my-location-in-your-palm.html>>, Google Mobile Blog, Google, Inc., Mountain View, California, Jun. 24, 2008, 7 pages.
Wilson, Ben, "iPhone OS 2.0 Maps app much improved," retrieved at <<http://reviews.cnet.com/8301-19512_7-10115612-233.html>>, CNET Reviews, Jul. 10, 2008, 1 page.
Dolcourt, Jessica, "Improved Google MyLocation: You are here," retrieved at <<http://download.cnet.com/8301-2007_4-10042907-12.html>>, CNET.com, The Download Blog, Sep. 16, 2008, 2 pages.
Chu, Mike, "New magical blue circle on your map," retrieved at <<http://googlemobile.blogspot.com/2007/11/new-magical-blue-circle-on-your-map.html>>, Google Mobile Blog, Google, Inc., Mountain View, California, Nov. 28, 2007, 26 pages.
"Topo Maps," retrieved at <<http://topomapsapp.com/guide_distbearing.html>>, User Guide: Distance and Bearing, retrieved on Sep. 17, 2010, 2 pages.
"Bing Maps," retrieved at <<http://www.microsoft.com/industry/government/products/bing_maps/default.aspx>>, Microsoft, Government, Microsoft Corporation, Redmond, Washington, retrieved on Sep. 17, 2010, 2 pages.

* cited by examiner

*Primary Examiner* — Michael J Zanelli
(74) *Attorney, Agent, or Firm* — The Law Office of Michael E. Kondoulis (57) ABSTRACT

A visual aid determination module (VADM) is described for presenting a visual aid that helps a user in interpreting a digital map. Namely, the visual aid helps the user in interpreting the relation of a currently-displayed map bounding region (MBR) to a center point of an inaccurate location region (ILR). The ILR, in turn, conveys a range of indeterminacy associated with a currently-assessed location of the user. In one case, the visual aid corresponds to a series of concentric circles. The curvature, placement, and spacing of the circles help the user determine his or her bearing with respect to the center point of the ILR.

17 Claims, 11 Drawing Sheets

VISUAL AID FOR ASSISTING A USER IN INTERPRETING A DIGITAL MAP

BACKGROUND

Some applications for use by mobile computing devices provide map-related services. In a typical example, such an application receives location information which describes the current location of a user. Based on the location information, the application can display a representation of the user's current location on a digital map. Such a service is useful in various circumstances. For example, a user who is traveling may wish to consult the digital map to determine his or her current location with respect to a target destination, such as a restaurant, movie theater, and so on.

However, due to inaccuracy in the position determination mechanism that is used, such an application can only assess the user's current location within a range of error. And sometimes this range of error is significant. The application can convey the level of inaccuracy using a visual aid, such as a tinted circle which overlays the digital map. This circle is generally referred to herein an inaccurate location region (ILR). A user may interpret the center point of the ILR as his or her presumed current location. The radius of the ILR corresponds to a degree of error associated with the current location. This visual aid provides valuable cues to the user in interpreting the digital map. For example, if the user notes that there is a large degree of error regarding the displayed current location, he or she will be duly warned against interpreting that location too literally.

However, the type of visual aid described above is not without its drawbacks. For example, assume that a user navigates within the IRL, e.g., by performing a panning and/or zooming selection, such that the outer boundary of the IRL is no longer visible. The application can provide various visual cues to alert the user to the fact that he or she is within the bounds of the IRL. But the user has no guidance as to where any displayed map position lies in regard to the IRL as a whole. The user can address this issue by zooming out and/or panning, but this provides poor user experience. Namely, a user may find this operation both burdensome and time-consuming.

SUMMARY

A visual aid presentation module (VAPM) is described which assists a user in interpreting a digital map. The VAPM operates by determining the placement of a map bounding region (MBR) with respect to an inaccurate location region (ILR). The MBR represents a portion of a digital map that the user is viewing at the moment. The ILR defines a spatial extent of indeterminacy with respect to a current position of the user. The VAPM then generates and displays a visual aid to the user which assists the user in assessing the relation of the MBR to the ILR.

For example, in one illustrative implementation, the VAPM can generate a visual aid which includes a series of concentric circles that are overlaid on the MBR. The placement of the MBR relative to the center point of the ILR governs the curvature of the concentric circles. For example, the concentric circles will appear progressively flatter as the user pans the MBR away from the center point of the ILR. Further, the spacing between the concentric circles decreases with increasing proximity to the center point of the ILR.

In operation, a mobile computing device may use the VAPM to display the visual aid when it determines that the MBR is entirely enclosed within the ILR. Other factors may also play in part in determining when to present the visual aid. Once presented, the visual aid assists the user in determining the placement of the MBR relative to the center point of the IRL, as well as the general distance of the MBR from the center point of the IRL. Guided thereby, the user can make appropriately-informed navigation decisions.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative map system that can present a visual aid. Section B describes illustrative methods which explain the operation of the map system of Section A. Section C describes illustrative processing functionality that can be used to implement any aspect of the features described in Sections A and B.

Figure 14:
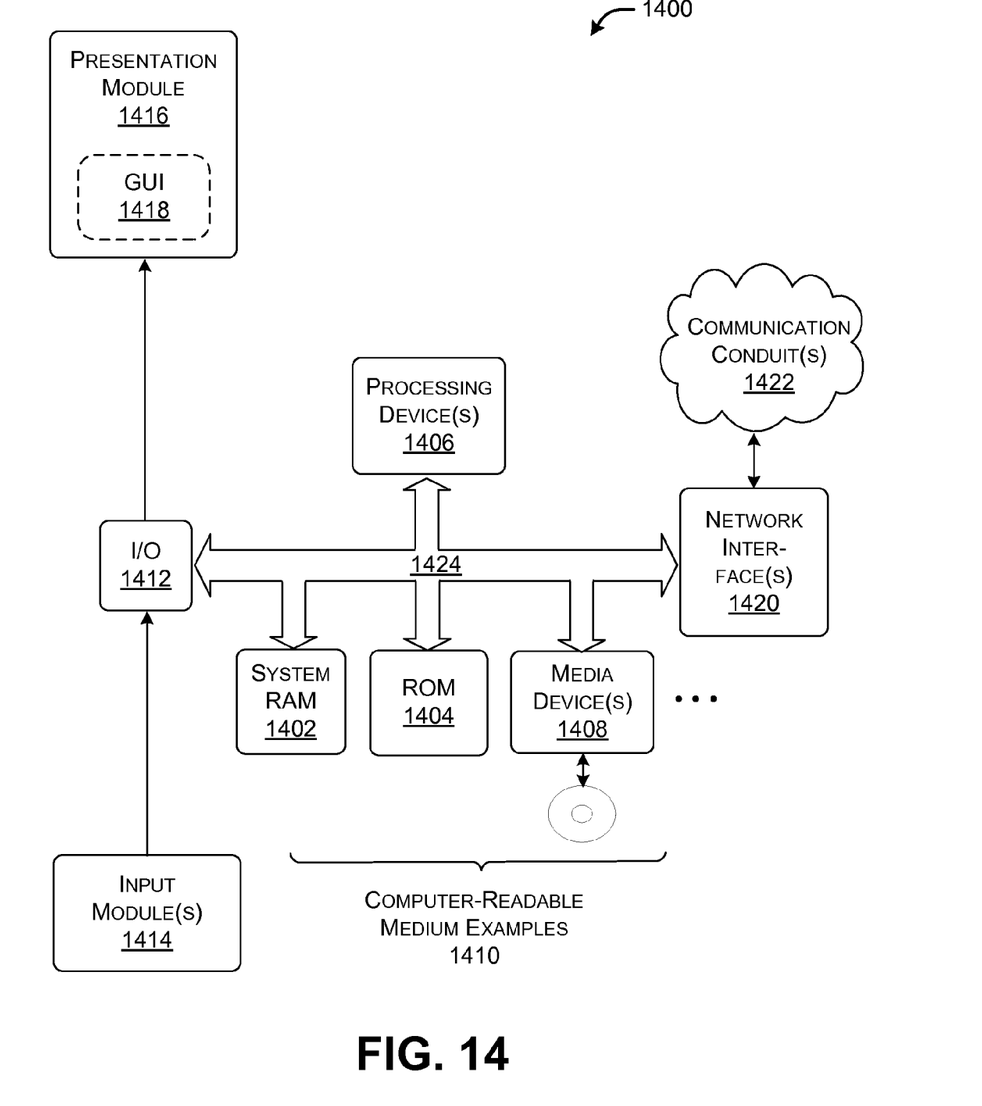
FIG. 14 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical mechanisms (e.g., software, hardware, firmware, etc., or any combination thereof). In one case, the illustrated separation of various components in the figures into distinct units may reflect the use of corresponding distinct physical components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 14, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical mechanisms (e.g., software, hardware, firmware, etc., or any combination thereof).

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Systems

Figure 1:
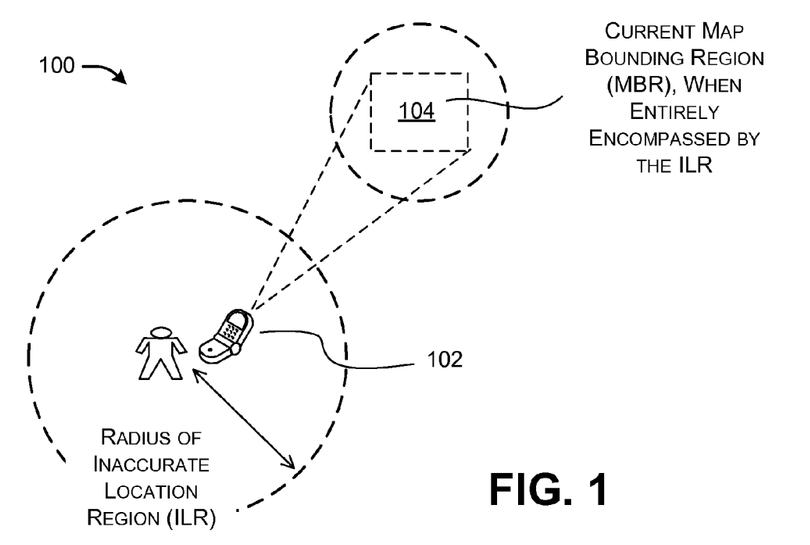
FIG. 1 shows one environment in which a map system can present a digital map. The map system incorporates a visual aid determination module (VADM) for presenting a visual aid that assists the user in interpreting the digital map.
Figure 2:
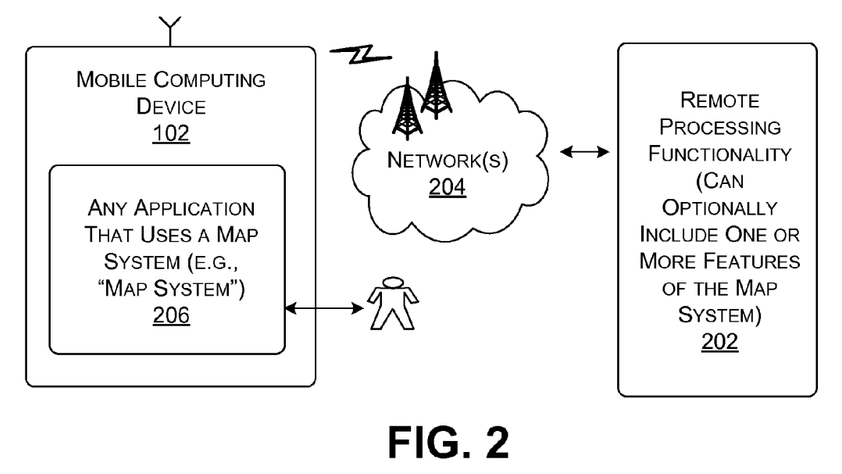
FIG. 2 shows illustrative functionality that can implement the map system of FIG. 1.

FIGS. 1 and 2 presents an overview of one illustrative environment 100 in which the functionality described herein can be applied. In this environment 100, the user operates a computing device 102 within a particular geographic region. The computing device 102 can correspond to any type of mobile computing device, such as, without limitation, a mobile telephone device, a personal digital assistant (PDA) device, a tablet-type device, a handheld game device, a booker reader device, a laptop computer device, a net book device, a media player device, a vehicle-mounted navigation device, and so on. Alternatively, the computing device 102 can correspond to a traditionally stationary device, such as a personal computer device, a workstation device, a game console device, a set-top box device, and so on. To facilitate explanation, the examples which follow will assume that the computing device 102 corresponds to some type of mobile device, but, as said, this example is presented by way of illustration, not limitation.

The computing device 102 includes any type of input mechanisms (such as a key input mechanism, a touch input mechanism, an audio input mechanism, etc.), and any type of output mechanisms (such as a display output mechanism, a speaker, a haptic output mechanism, etc.). The computing device 102 may also include memory and storage resources, processing resources, wireless communication resources, etc.

As indicated in FIG. 2, the computing device 102 can interact with remote processing functionality 202 via one or more networks 204. The remote processing functionality 202 can correspond to one or more server-type computers, one or more data stores, routing functionality, etc. The remote processing functionality 202 can provide any services to the user in connection with the use of the computing device 102. The network(s) 204 can correspond to any local area network and/or wide area network (such as the Internet), including any type of wireless and hardwired links. The network can be governed by any protocol or combination of protocol. The network(s) 204 can also encompass telecommunication equipment for implementing wireless communication with the computing device 102, such as a plurality of cell towers, a plurality of base stations, and so on.

The computing device 102 can implement one or more applications that perform any respective tasks. More specifically, the computing device 102 can implement any application using resources provided by the computing device 102, based on resources provided by the remote processing functionality 202, or based on resources provided by both local and remote sources.

One possible application provides a map-related service. That application is referred to herein as a map system 206. FIG. 2 indicates that the map system 206 is implemented by local resources at the computing device 102; but the map system 206 can be implemented by any combination of local and remote sources in the manner specified above.

More specifically, the map system 206 displays a digital map to the user on a display device of the computing device 102. Further, the map system 206 receives an indication of the user's current location from one or more position determination mechanisms. The position determination mechanisms can use different respective techniques to assess the position of the user. For example, a first position determination mechanism can assess the position of the user using a GPS technique (e.g., involving the use of satellite technology). A second position determination mechanism can assess the position of the user using a cell tower triangulation technique, and so on. Still other position determination mechanisms are possible. For example, a position determination mechanism can get a rough idea of the location of the user based on the identity of the cell tower with which the user is currently communicating (e.g., without performing triangulation), or based on a wireless access point through which the user has established a Wi-Fi connection or the like.

The different position determination mechanisms have different levels of accuracy associated therewith. In one approach, the map system 206 may attempt to assess the user's location using the most accurate position determination mechanism. But if such a mechanism is not possible, the map system 206 may be forced to rely on a less accurate technique. In one approach, the map system 206 can designate an assessed location as being uncertain if the error associated therewith exceeds a prescribed threshold. Different map systems can define this threshold in different ways to suit different respective objectives.

The map system 206 can convey the degree of error associated with a current location of the user in various ways. In one approach, the map system 206 can display a visual aid that represents the level of error, such as a tinted circle or the like. The user's actual location may correspond to any position within the tinted circle; but, in practice, the user may interpret the center point of the circle as a best guess regarding his or her location at the present time. An icon may designate the center point of the circle. The radius of the circle corresponds to an assessed degree of error in the user's location. In the terminology used herein, the region enclosed by such a circle is referred to as an inaccurate location region (ILR). Although the ILR region shown in FIG. 1 is circular in shape, the map system 206 can depict the ILR using other shapes.

At any given time, the user may be viewing a particular portion of a digital map. In the terminology used herein, the portion of the map that is displayed at any time is referred to as the map bounding region (MBR). In one case, the computing device 102 includes a rectangular display mechanism. Hence, the MBR may correspond to a rectangular portion of the digital map, demarcated by the four corner positions of the rectangular portion. From a high-level perspective, FIG. 1 represents the MBR as region 104. However, the MBR can generally have any implement-specific shape; it need not be rectangular.

Figure 10:
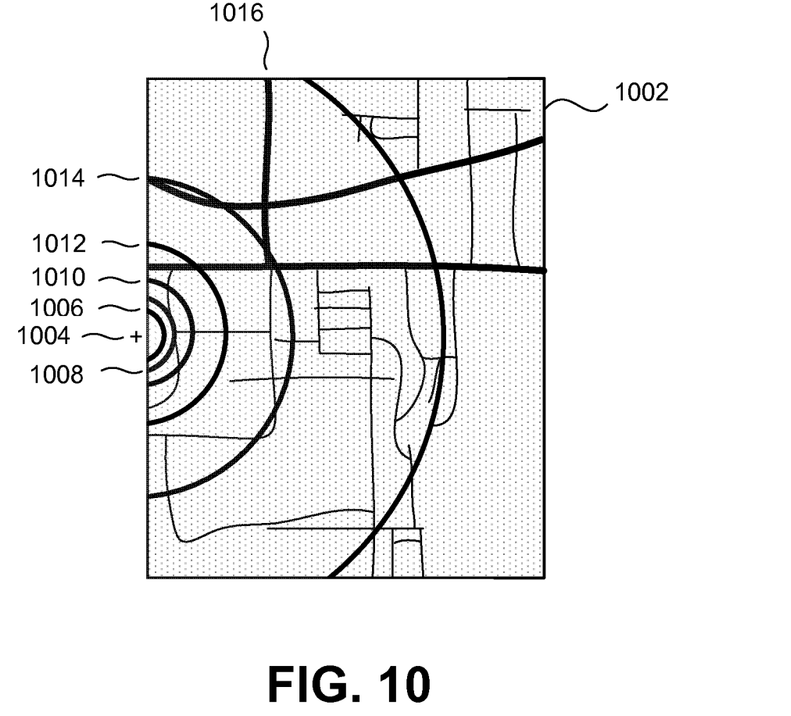

More specifically, when the user first activates the map system 206, the map system 206 can display a portion of a more encompassing digital map that is centered at the presumed location of the user. As said, the location may be inexact. If so, the map system 206 can display any type of visual aid that describes the ILR, such as the above-described tinted circle. In one particular (although only representative) case, the map system 206 may display an MBR that has a particular zoom level for which at least part of the outer border of the ILR is visible (e.g., as shown in the example of FIG. 10).

At this point, assume that the user enters navigation selections which change the focus of the MBR. That is the user may enter either zooming or panning selections (or both) which change the portion of the digital map depicted in the MBR. In some cases, the user may zoom and/or pan into the ILR to get an enlarged view of a region associated with the ILR. For example, in the example of FIG. 11, the user may make both a zooming and panning selection to produce the MBR shown in FIG. 12.

At some juncture, the user may zoom into the ILR such that the boundaries of the ILR are no longer visible. In other words, the user may produce an MBR that is entirely enclosed by ILR. FIG. 1 depicts this scenario in high-level form. At this point, the user may lose his or her bearings with respect to how the MBR spatially relates to the ILR. To assist the user in this circumstance, the map system 206 provides a visual aid that displays the relation of the MBR to the ILR. Different possible implementations of the visual aid (and functionality for producing the visual aid) are set forth below.

Figure 3:
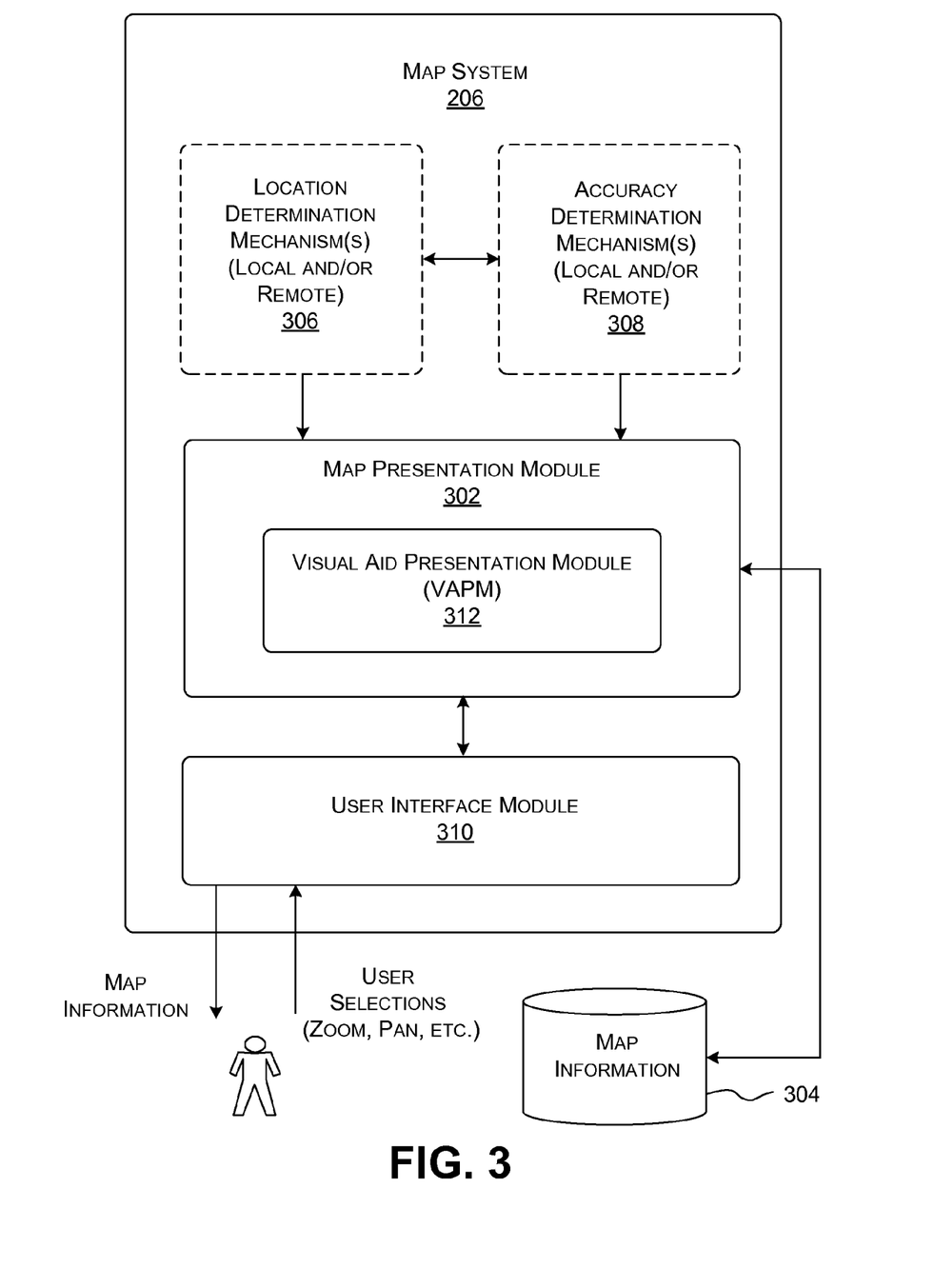
FIG. 3 shows, in greater detail, one illustrative implementation of the map system of FIGS. 1 and 2.

Starting with FIG. 3, this figure shows one implementation of the map system 206. In one case, some part of the map system 206 can be implemented by the computing device 102 and some part can be implemented by the remote processing functionality 202 (or other remote mechanisms), as will be clarified in the explanation below.

The map system 206 can include a map presentation module 302 as a core component thereof. The map presentation module 302 can, in one implementation, be implemented as software that is resident on the computing device 102. The map presentation module 302 can display map content corresponding to a digital map that is provided by a remote data store 304. Alternatively, or in addition, the map presentation module 302 can display map content that originates from a local data store (not shown). The digital map may provide information regarding a geographical area, such as by showing street names, business locations, natural features, and so on. For example, Bing™ maps, provided by Microsoft Corporation of Redmond, Wash., can provide the map information.

The map presentation module 302 can also receive location information from one or more position determination mechanisms 306. The position determination mechanisms 306 can use any of the techniques described above to assess the current location of the user (e.g., GPS, cell tower triangulation, etc.). The map presentation module 302 can also receive accuracy information from one or more accuracy determination mechanisms 308. The accuracy determination mechanisms 308 work in conjunction with the position determination mechanisms 306 to assess the level of error associated with the user's current assessed position. Functionality provided by the position determination mechanisms 306 and the accuracy determination mechanisms can be local and/or remote with respect to the computing device 102.

The map presentation module 302 can also receive input from a user interface module 310. The user interface module 310 can receive input from the user, such as zooming and panning selections from the user. Through these selections, the user can change the map content provided by the MBR. The user interface module 310 also outputs map information to the user via a display mechanism and/or other output mechanism.

Finally, the map presentation module 302 can include a visual aid presentation module (VAPM) 312 as a component part thereof. The VAPM 312 can display a visual aid which assists the user in determining the spatial relation of the MBR to the ILR, as will be set forth in greater detail below in Section B. By way of overview, the visual aid allows the user to gain insight into the direction of the center point of the ILR with respect to the map content that is currently being presented by the MBR. The visual aid also allows the user to gain insight into how far way the center point of the ILR is with respect to the current map content that is presented by the MBR.

B. Illustrative Processes and Examples

FIGS. 4-12 show procedures and corresponding examples which illustrate one manner of operation of the visual aid presentation module (VAPM) 312 of FIG. 3. Starting with FIG. 4, this figure shows a procedure 400 that represents an overview of one manner of operation of the map system 206 (which includes the VAPM 312 as a component thereof).

Figure 4:
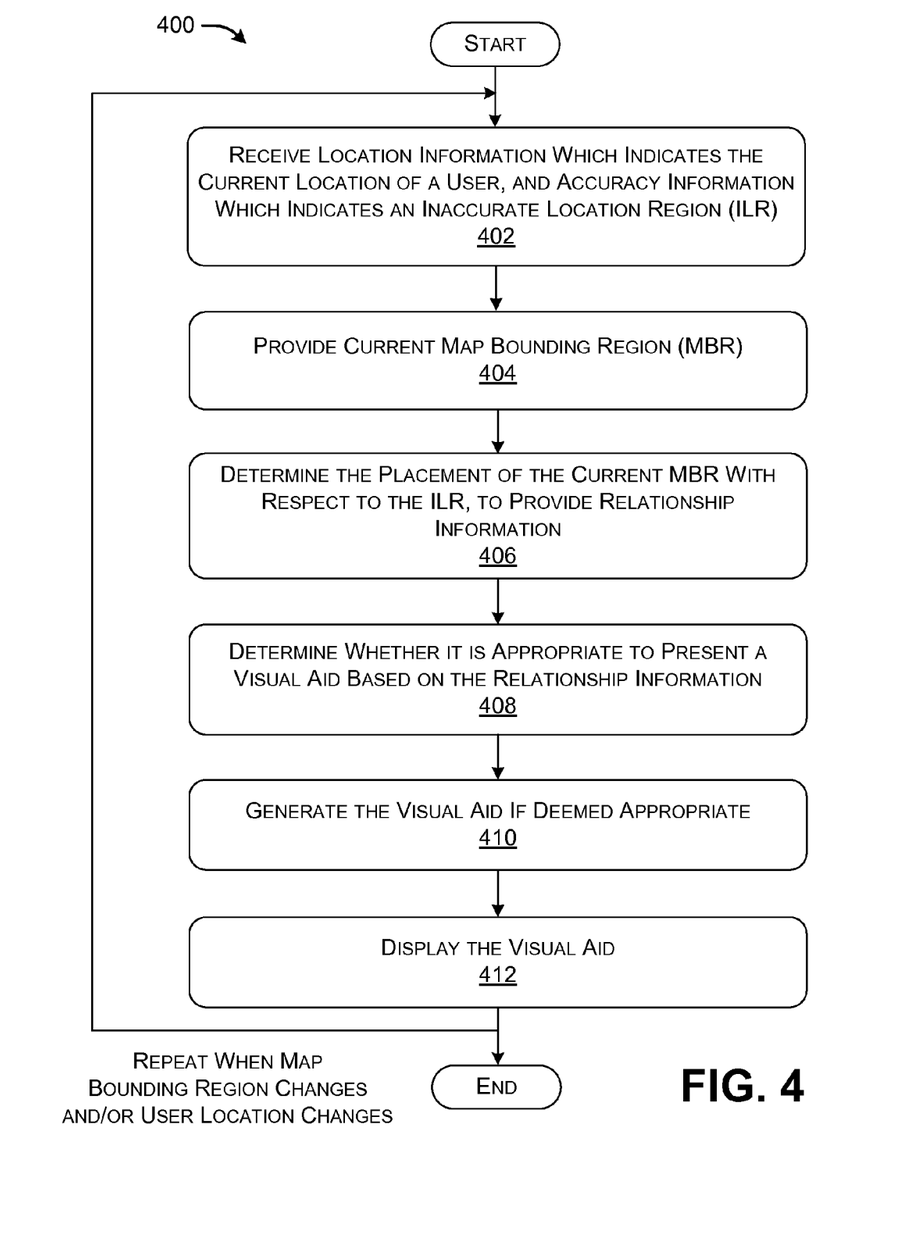
FIG. 4 is a flowchart which describes an overview of one illustrative manner of operation of the map system of FIGS. 1 and 2.

In block 402, the map system 206 receives location information which indicates the current location of a user within a geographic area, together with accuracy information which indicates the level of imprecision in the location information. From this information, the map system 206 can construct a representation of an inaccurate location region (ILR). The size (e.g., radius) of such a region corresponds to the degree of imprecision in the location information.

In block 404, the map system 206 displays a current map bounding region (MBR) to the user. As noted above, the MBR depicts a particular portion of a digital map. In the case that the display output mechanism has a rectangular shape, the MBR represents a corresponding rectangular portion of a more encompassing digital map.

Figure 5:
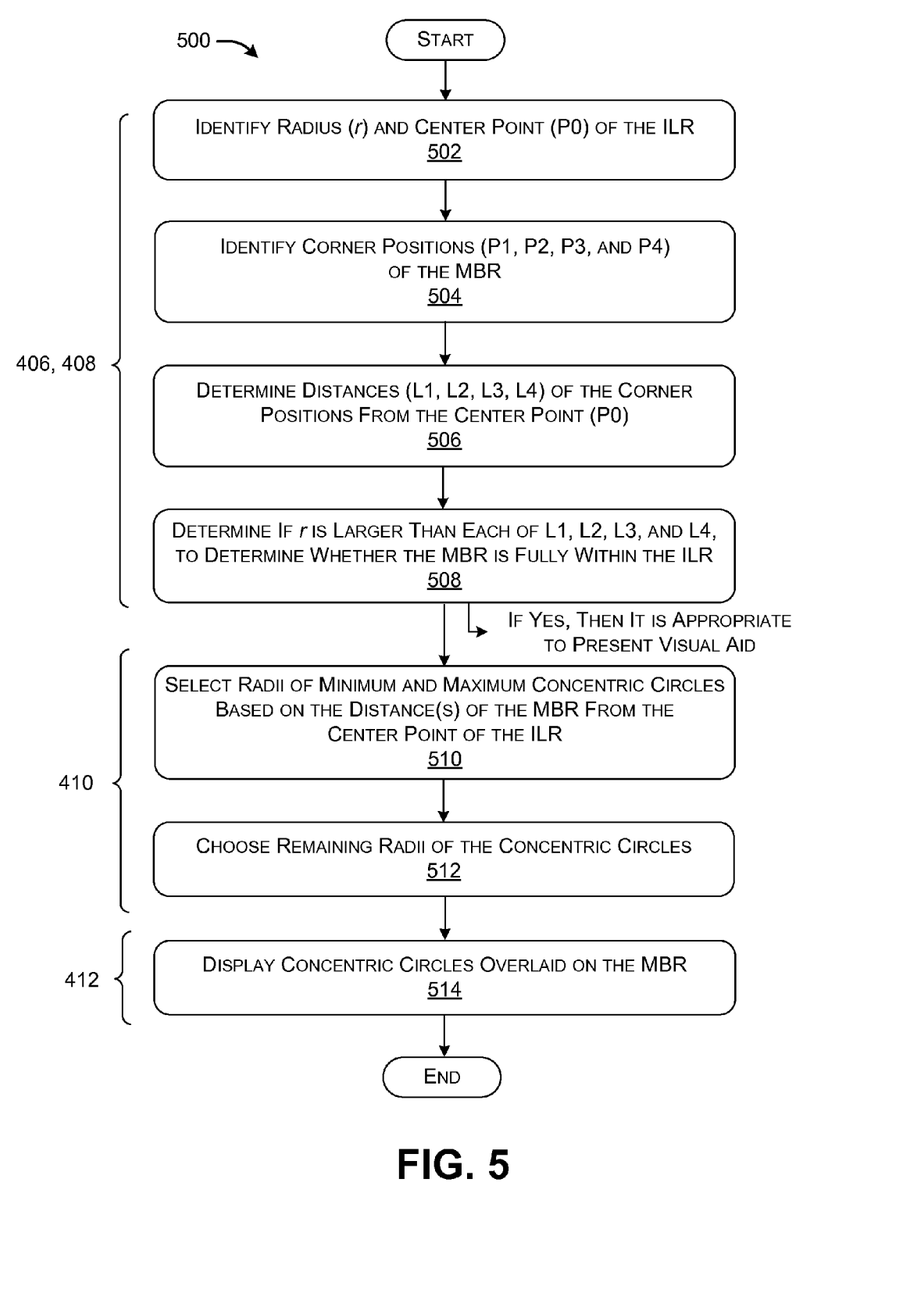
FIG. 5 is a flowchart that describes one implementation of the general procedure illustrated in FIG. 4. That implementation involves displaying a visual aid that includes a series of concentric circles.
Figure 6:
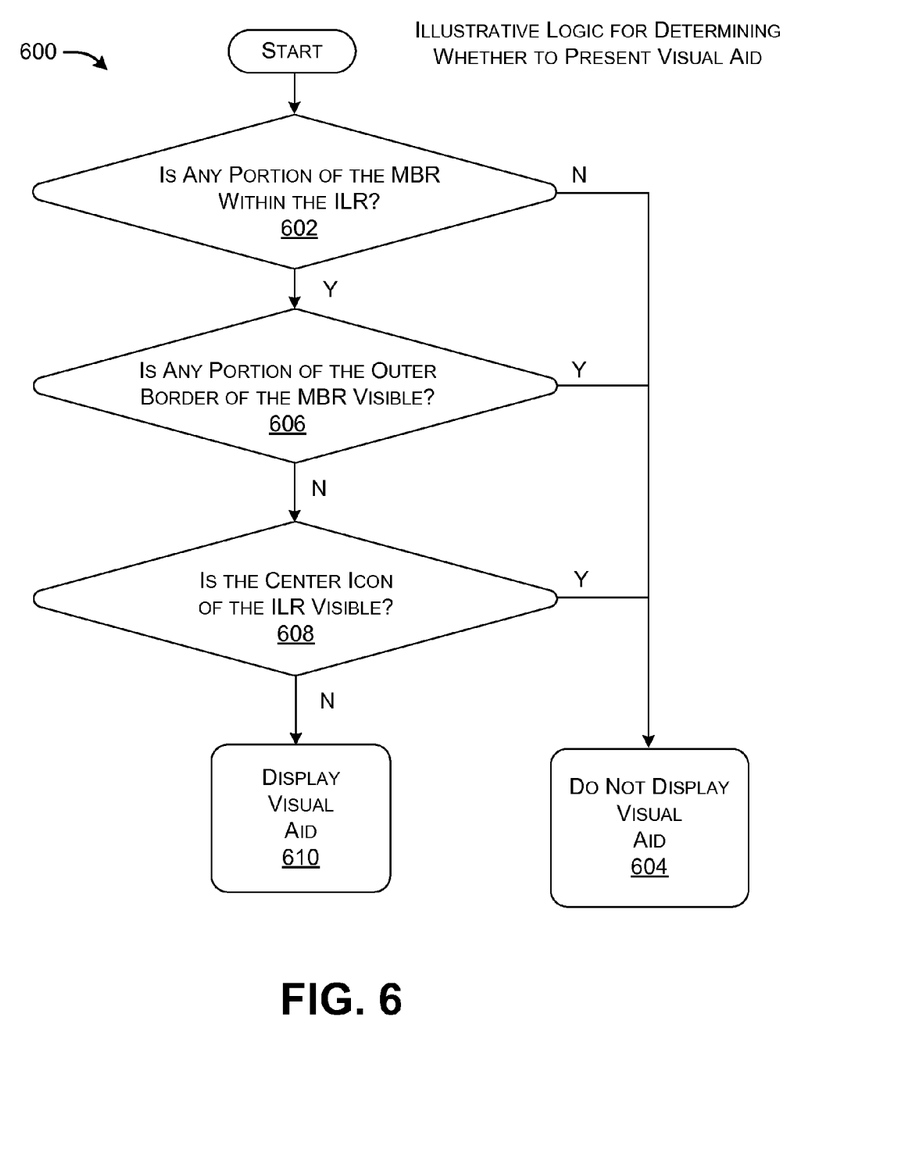
FIG. 6 shows logic that can be used to determine whether it is appropriate to present the visual aid.

In block 406, the VAPM 312 determines the placement of the current MBR with respect to the ILR. This yields relationship information in the terminology used herein. FIG. 5 will describe one way that this function can be performed. In block 408, the VAPM 312 determines whether it is appropriate to display a visual aid based on the relationship information. FIGS. 5 and 6 will illustrate logic that can be used to make this assessment. In block 410, the VAPM 312 generates the visual aid (if it is deemed appropriate, in block 408, to do so). FIG. 5 will describe one way that this function can be performed. And finally, in block 412, the VAPM 312 displays the visual aid.

The feedback loop shown in FIG. 4 indicates that the procedure 400 can be repeated when the user changes the MBR, e.g., in response to a zooming and/or panning selection from the user. In addition, the procedure 400 is repeated when the location of the user changes.

FIG. 5 shows a procedure 500 for carrying out some of the high-level functions described in FIG. 4. This procedure 500 is presented by way of illustration, not limitation. That is, other implementations can provide other algorithms for performing the analysis described herein.

In block 502, the VAPM 312 identifies the radius (r) and center point P0 of the ILR. In block 504, the VAPM 312 identifies the corner positions of the MBR (presuming, in one case, that the MBR corresponds to a rectangular portion of map content). The corner positions are denoted herein as positions P1, P2, P3, and P4.

In block 506, the VAPM 312 next determines the distances of between each corner position and the center point (P0) of the ILR. These distances are denoted as L1, L2, L3, and L4 herein. For example, the distance L1 between the upper-left corner position P1 and the center point P0 can be calculated as $L1 = \sqrt{(P1_x - P0_x)^2 + (P1_y - P0_y)^2}$, where $P1_x$ and $P1_y$ represent the x and y coordinates of the position P1, and $P0_x$ and $P0_y$ represent the x and y coordinates of the position P0.

In block 508, the VAPM 312 determines if r (the radius of the ILR) is larger than each of L1, L2, L3, and L4. If so, this indicates that the MBR is entirely encompassed within the ILR. This also means that the MBR will display no portion of the outer boundary of the ILR. In one case, if block 508 is answered in the affirmative, then the VAPM 312 determines that it is appropriate to present the visual aid. In other cases, the VAPM 312 can apply additional factors in determining whether it is appropriate to display the visual aid (as will be set forth in the context of FIG. 6). Generally, the operations described in blocks 502-508 correspond to one implementation of the operations described in block 406 and 408 of FIG. 4.

In block 510, the VAPM 312 proceeds to generate the visual aid (if it is determined that it is appropriate to present the visual aid). In one approach, this entails displaying a series of N concentric circles which are overlaid on the MBR. For example, in merely one example, the VAPM 312 generates eight concentric circles, six of which will be visible in the MBR. Block 510 entails choosing the radii in any manner. The N concentric circles include a smallest concentric circle having a smallest radius and a largest concentric circle having a largest radius.

For example, the VAPM 312 can determine the distances between an outer perimeter of the MBR and the center point P0 of the IRL. These distances include a minimum distance and a maximum distance. (The maximum distance corresponds to one of the distances L1, L2, L3, and L4, associated with a corner position of the MBR). The VAPM 312 can select this smallest distance to correspond to the radius of a smallest concentric circle (e.g., circlet). The VAPM 312 can select the largest distance to correspond to the radius of a largest concentric circle (e.g., circle8).

In block 512, the VAPM 312 chooses the radii of the remaining concentric circles, e.g., the six (visible) circles between the smallest concentric circle and the largest concentric circle. The VAPM 412 can perform this function by choosing the seventh concentric circle (circle7) to correspond to a midpoint between the first (smallest) radius value and eighth (largest) radius value. It can choose the sixth circle to correspond to midpoint between seventh radius value and the first (smallest) radius value, and so on. As can be appreciated, the spacing between concentric circles produced in this operation decreases as a map position draws closer to the center point (P0) of the IRL. Generally, blocks 510 and 512 correspond to one way of implementing block 410 of FIG. 4, among other possible ways. In block 514, the VAPM 312 displays the thus-produced concentric circles over the MBR. This operation corresponds to block 412 of FIG. 4.

FIG. 6 shows a procedure 600 that represents logic for determining whether to present the visual aid, according to one implementation. The visual aid may correspond to the above-described concentric circles. In block 602, the VAPM 312 determines whether the any portion of the MBR is enclosed within the ILR. If not, there is no need to display the visual aid, as conveyed in block 604.

In block 606, the VAPM 312 determines whether any portion of the outermost border of the ILR is visible. This is tantamount to asking whether the MBR is entirely enclosed within the ILR, as described above. If not, then it may be deemed unnecessary to display the visual aid. This is because the user can gain his or her bearing based on the depiction of the outer boundary of the ILR.

In block 608, presuming that the MBR is entirely enclosed within the ILR, the VAPM 312 next asks whether a center icon associated with the ILR is visible within the MBR. Again, if this is true, it may be deemed unnecessary to present the visual aid. This is because the user can gain his or her bearing based on the depiction of the icon associated with the center point of the ILR.

In block 610, presuming that all of the inquiries in blocks 602, 606, and 608 are answered in a manner which does not lead to block 604, then the VAPM 312 can generate and display the visual aid. This logic, however, can be varied in any number of ways. For example, in another implementation, the VAPM 312 can decide to present the visual aid regardless of whether the outer boundary of the ILR and/or the center icon are visible within the MBR.

Figure 7:
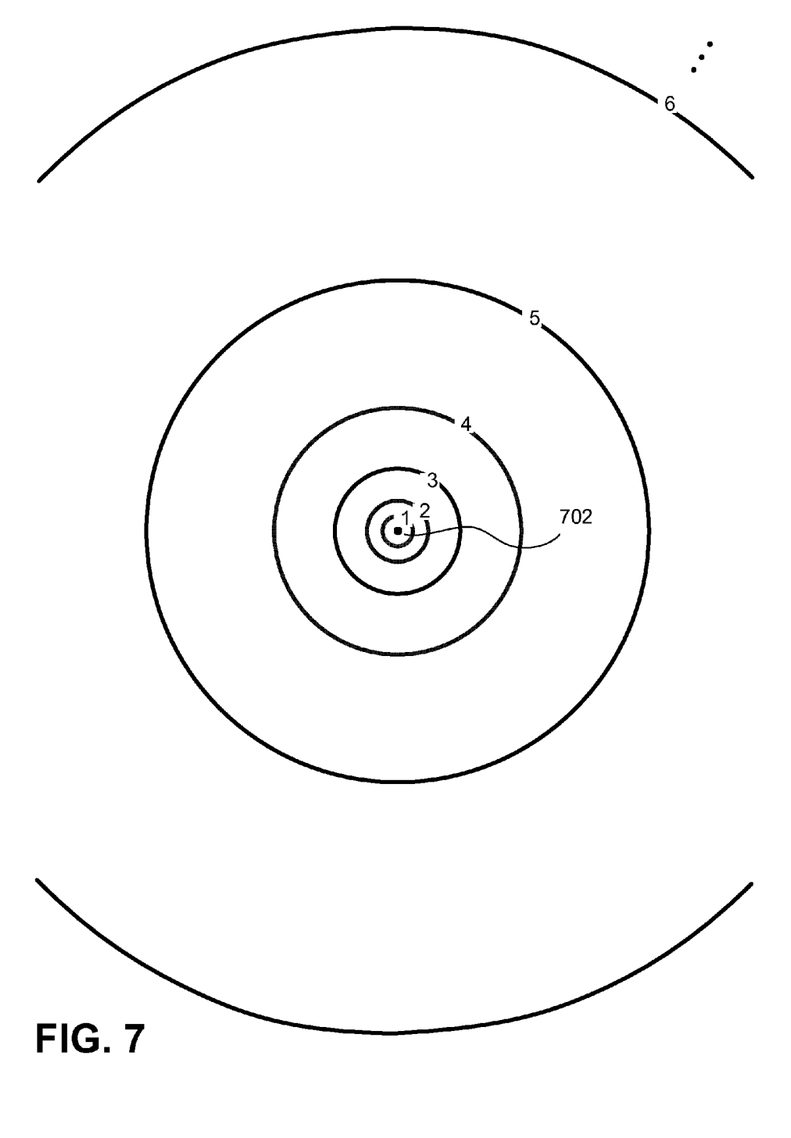
FIG. 7 shows a visual aid that comprises a series of concentric circles.

FIG. 7 shows one depiction of a visual aid that includes a series of concentric circles. As will be described below, the VAPM 312 may present a portion of these circles on the MBR. An icon 702 may represent the center point (P0) of the ILR. In this case, the concentric circles have a center point which coincides with the center point of the ILR. But in other implementations, this need not be the case. As noted above, the spacing between the circles decreases as the distance from the center point P0 decreases.

Figure 8:
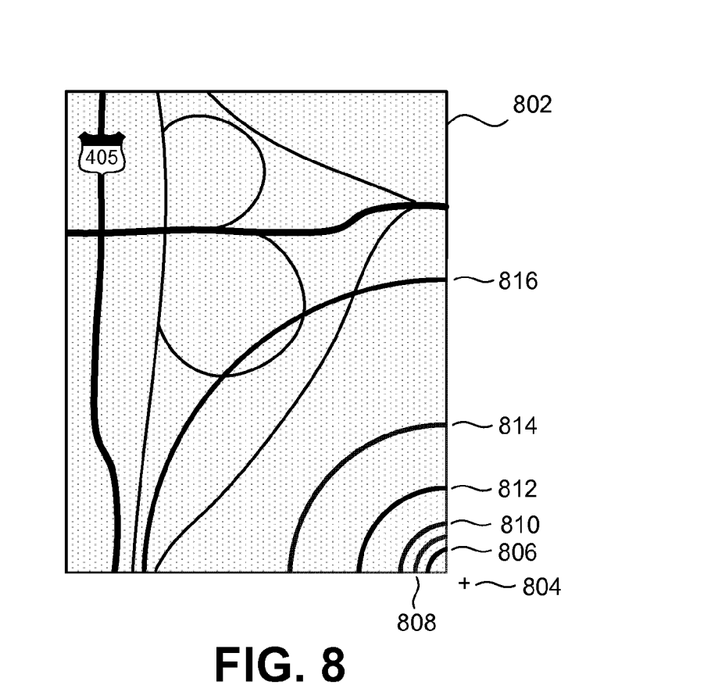
FIGS. 8-10 show three applications of the type of visual aid illustrated in FIG. 7.
Figure 9:
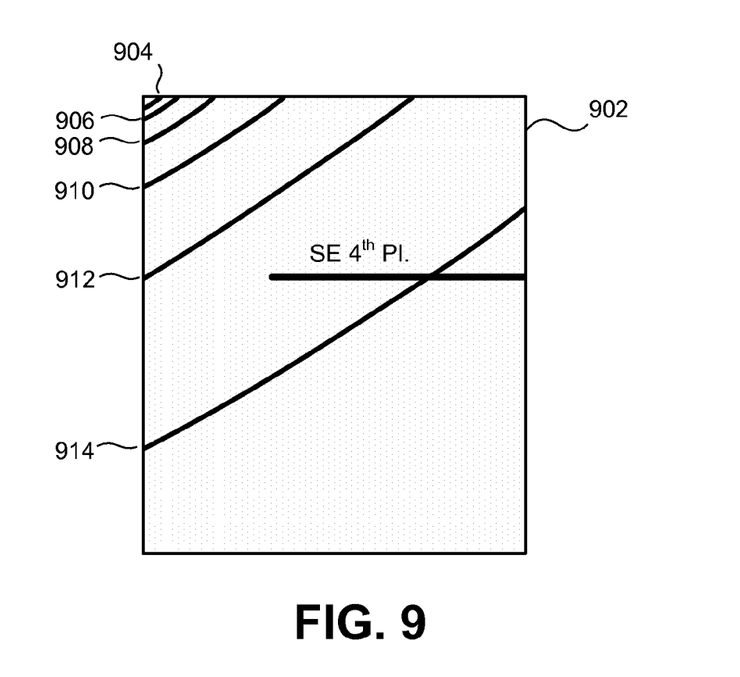

FIG. 8 shows an example of one use of the visual aid, as overlaid on a first MBR 802. The center point of the ILR corresponds to position 804, which is not visible in the MBR 802. A series of six concentric circles fan out from this position 804, including circles 806, 808, 810, 812, 814, and 816, although this number can be varied for different implementations (e.g., by presenting more than six circles or less than six circles). FIG. 9 shows an example of another use of the visual aid, as overlaid on a second MBR 902. The VAPM 312 in this case displays the same number (e.g., six) of concentric circles, e.g., circles 904, 906, 908, 910, 912, and 914.

In the first example (of FIG. 8), the MBR corresponds to map positions that are relatively close to the center point of the ILR. In the second example (of FIG. 9), the MBR corresponds to map positions that are relatively far from the center point of the ILR. The VAPM 312 can convey this relative positioning based on the curvatures of the concentric circles. Namely, the circles in the case of FIG. 8 have more pronounced arcs compared to the circles in FIG. 9.

Moreover, in both cases, the visual aid conveys the general direction at which the center point of the ILR is located. That is, the visual aid conveys this information based on both the curvature and positioning of the concentric circles, as well as the spacing between the circles. In more formal terms, a normal to the arcs corresponds to a line which intersects the center point of the IRL. The direction of the center point relative to the MBR corresponds to the direction of decreasing spacing between circles.

FIG. 10 shows another case in which the VAPM 312 displays the concentric circles on an MBR 1002. In this case, the MBR represents a lower zoom level compared to the cases of FIGS. 8 and 9. The center point of the ILR corresponds to position 1004, which is not visible in the MBR 1002. A series of concentric circles fan out from this position 1004, including circles 1006, 1008, 1010, 1012, 1014, and 1016. This example demonstrates that the portion of the concentric circles that is displayed depends on the placement of the MBR relative to the center point of the ILR (as set forth above), as well as the zoom level associated with the MBR.

Figure 11:
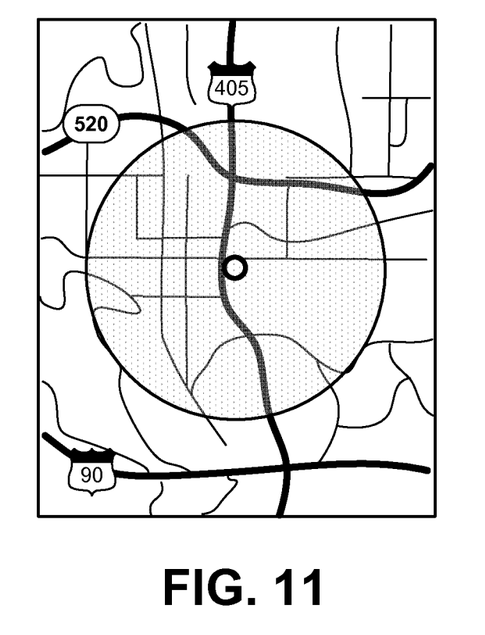
FIGS. 11 and 12 show two circumstances in which the map system may decide to refrain from presenting the visual aid.
Figure 12:
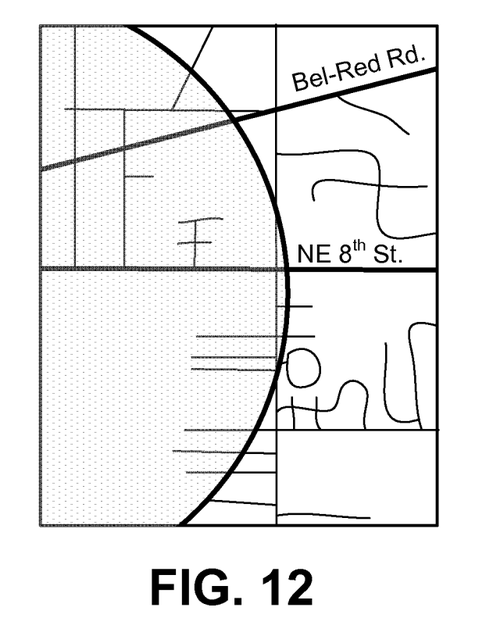

As noted above, the VAPM 312 can refrain from presenting the visual aid when either the outer border of the IRL is visible within the MBR, or the center icon of the IRL is visible within the MBR. FIG. 11 shows a first scenario in which both of these conditions are met. FIG. 12 shows a second scenario in which just the first condition is met. However, in another implementation, the VAPM 312 can display the visual aid in the scenarios represented by FIGS. 11 and 12. Indeed, in one implementation, the VAPM 312 can display the visual aid any time any portion of the IRL is visible.

Figure 13:
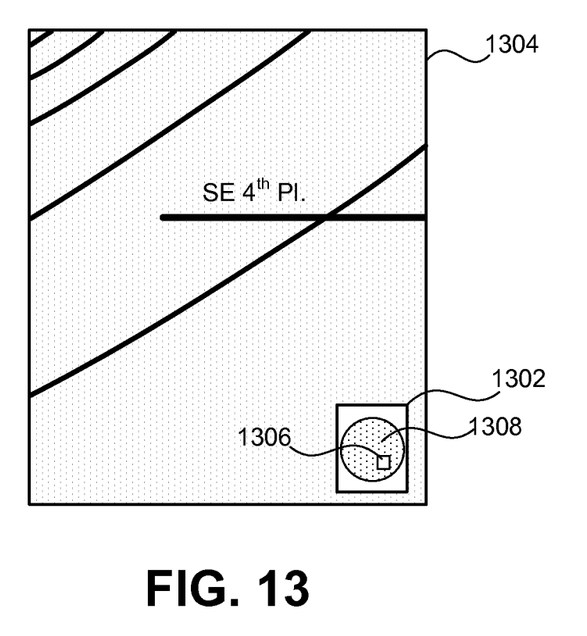
FIG. 13 shows another type of visual aid.

Finally, FIG. 13 demonstrates that the VAPM 312 can display other types of visual aids besides, or in addition to, the above-described concentric circles. For example, in FIG. 13, the VAPM 312 provides a sub-window 1302 within the MBR 1304. The sub-window 1302 provides a symbol 1306 which represents the location of the MBR 1304 within the ILR 1308. In other words, the sub-window 1302 presents a bird's-eye view (e.g., a zoomed-out view) of the relation of the MBR as a whole with respect to the IRL as a whole.

C. Representative Processing Functionality

FIG. 14 sets forth illustrative electrical data processing functionality 1400 that can be used to implement any aspect of the functions described above. The electrical data processing functionality 1400 represents a physical and tangible machine. With reference to FIGS. 1-3, for instance, the type of processing functionality 1400 shown in FIG. 14 can be used to implement any aspect of the map system 206, which, as said can be implemented by the computing device 102, the remote processing functionality 202, or both. In one case, the processing functionality 1400 may correspond to any type of computing device that includes one or more processing devices.

The processing functionality 1400 can include volatile and non-volatile memory, such as RAM 1402 and ROM 1404, as well as one or more processing devices 1406. The processing functionality 1400 also optionally includes various media devices 1408, such as a hard disk module, an optical disk module, and so forth. The processing functionality 1400 can perform various operations identified above when the processing device(s) 1406 executes instructions that are maintained by memory (e.g., RAM 1402, ROM 1404, or elsewhere). The logic associated with the instructions transforms the processing functionality 1400 into a distinct form of physical and tangible machine.

More generally, instructions and other information can be stored on any computer readable medium 1410, including, but not limited to, static memory storage devices, magnetic storage devices, optical storage devices, and so on. The term computer readable medium also encompasses plural storage devices. In all cases, the computer readable medium 1410 represents some form of physical and tangible mechanism.

The processing functionality 1400 also includes an input/output module 1412 for receiving various inputs from a user (via input modules 1414), and for providing various outputs to the user (via output modules). One particular output mechanism may include a presentation module 1416 and an associated graphical user interface (GUI) 1418. The processing functionality 1400 can also include one or more network interfaces 1420 for exchanging data with other devices via one or more communication conduits 1422. The network interfaces 1420 can encompass wireless communication functionality for communicating with wireless communication infrastructure. One or more communication buses 1424 communicatively couple the above-described components together.

In closing, the description may have described various concepts in the context of illustrative challenges or problems. This manner of explication does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, using physical data processing functionality, for assisting a user in interpreting a digital map, comprising:
providing a current map bounding region (MBR) in response to a selection from the user, the MBR representing a portion of the digital map;
determining a placement of the MBR with respect to an inaccurate location region (ILR) to provide relationship information, the ILR defining a spatial extent of indeterminacy with respect to a current location of the user;
determining whether it is appropriate to provide a visual aid to the user based on the relationship information;
generating the visual aid if it is deemed appropriate to provide the visual aid; and
displaying the visual aid on the digital map, the visual aid assisting the user in assessing a relation of the MBR to a center point of the ILR,
wherein said determining of the placement of the MBR comprises determining whether the MBR is entirely enclosed within the ILR.

2. The method of claim 1, wherein the method is performed, at least in part, by a mobile computing device which communicates with a communication system via wireless communication.

3. The method of claim 1, further comprising receiving location information from a position determination mechanism, wherein the location information expresses the current location of the user.

4. The method of claim 1, further comprising receiving accuracy information from an accuracy determination mechanism, wherein the accuracy information expresses the spatial extent of indeterminacy.

5. The method of claim 1, wherein said determining of whether the MBR is entirely enclosed within the ILR comprises:
identifying a radius of the ILR and the center point of the ILR;
identifying corner positions of the MBR;
determining distances of from the corner points to the center point of the LIR; and
determining whether the radius of the ILR is larger than all of the distances, indicating that the MBR is entirely enclosed by the ILR.

6. The method of claim 1, wherein it is deemed appropriate to present the visual aid if the MBR is entirely enclosed by the ILR.

7. The method of claim 1, wherein it is deemed appropriate to present the visual aid if an outermost border of the ILR is not visible.

8. The method of claim 1, wherein it is deemed appropriate to present the visual aid if a center icon associated with the center point of the ILR is not visible.

9. The method of claim 1, further comprising repeating said generating and displaying of the visual aid when the user makes a selection which changes the MBR or the current location of the user changes.

10. The method of claim 9, wherein the selection is at least one of a zooming selection or a panning selection.

11. A method, using physical data processing functionality, for assisting a user in interpreting a digital map, comprising:
providing a current map bounding region (MBR) in response to a selection from the user, the MBR representing a portion of the digital map;
determining a placement of the MBR with respect to an inaccurate location region (ILR) to provide relationship information, the ILR defining a spatial extent of indeterminacy with respect to a current location of the user;
determining whether it is appropriate to provide a visual aid to the user based on the relationship information;
generating the visual aid if it is deemed appropriate to provide the visual aid; and
displaying the visual aid on the digital map, the visual aid assisting the user in assessing a relation of the MBR to a center point of the ILR,
wherein said determining of the placement of the MBR comprises determining whether the MBR is entirely enclosed within the ILR,
wherein said generating of the visual aid comprises generating a series of concentric circles, and
wherein said generating comprises generating a same number of concentric circles regardless of the relation of the MBR to the center point of the ILR.

12. The method of claim 11, wherein each concentric circle has a degree of curvature that conveys a relative distance between map positions that are represented by the MBR and the center point of the ILR.

13. The method of claim 11, further comprising:
identifying the center point of the ILR;
determining distances of between a perimeter of the MBR and the center point of the ILR, the distances including a minimum distance and a maximum distance; and
selecting a radius of a smallest concentric circle to correspond to the minimum distance, and selecting a radius of a largest concentric circle to correspond to the maximum distance.

14. The method of claim 11, wherein spacing between the concentric circles decreases with increasing proximity to the center point of the ILR.

15. A wireless mobile computing device comprising a map system configured to assist a user in interpreting a digital map, comprising:
a map presentation module configured to display a current map bounding region (MBR) in response to a selection from the user, the MBR representing a portion of the digital map, the map presentation module including a visual aid presentation module, comprising:
logic configured to determine a placement of the MBR with respect to an inaccurate location region (ILR) to provide relationship information, the ILR defining a spatial extent of indeterminacy with respect to a current location of the user;
logic configured to generate a visual aid based on the relationship information; and
logic configured to display the visual aid on the digital map, the visual aid assisting the user in assessing a relation of the MBR to a center point of the ILR when the center point is not displayed on the MBR.

16. A physical and tangible computer readable medium for storing computer readable instructions, the computer readable instructions providing a visual aid presentation module when executed by one or more processing devices, the computer readable instructions comprising:
logic configured to determine a placement of a map bounding region (MBR) with respect to an inaccurate location region (ILR) to provide relationship information, the MBR representing a portion of a digital map, and the ILR defining a spatial extent of indeterminacy with respect to a current location of the user;
logic configured to generate a visual aid based on the relationship information, the visual aid comprising a series N concentric circles that are placed with respect to a center point of the ILR;
logic configured to display the visual aid on the digital map, the visual aid assisting the user in assessing a relation of the MBR to a center point of the ILR, and
logic configured to determine whether it is appropriate to provide the visual aid, said logic configured to determine whether it is appropriate comprising:
logic configured to identify a radius of the ILR and the center point of the ILR;
logic configured to identify corner positions of the MBR;
logic configured to determine distances from the corner points to the center point of the ILR; and
logic configured to determine whether the radius of the ILR is larger than all of the distances, indicating that the MBR is entirely enclosed by the ILR, and hence indicating that it is appropriate to provide the visual aid.

17. The computer readable medium of claim 16, wherein said logic configured to generate the visual aid comprises:
logic configured to determine distances of between a perimeter of the MBR and the center paint of the ILR, the distances including a minimum distance and a maximum distance; and
logic configured to select a radius of a smallest concentric circle to correspond to the minimum distance, and select a radius of a largest concentric circle to correspond to the maximum distance; and
logic configured to select radii of remaining concentric circles such that a spacing between the concentric circles decreases with increasing proximity to the center point of the ILR.

* * * * *